Mar. 27, 1923.
B. R. PFEIFER
1,449,544
APPARATUS FOR DESTRUCTIVELY DISTILLING VEGETABLE MATERIAL
Filed Mar. 15, 1920
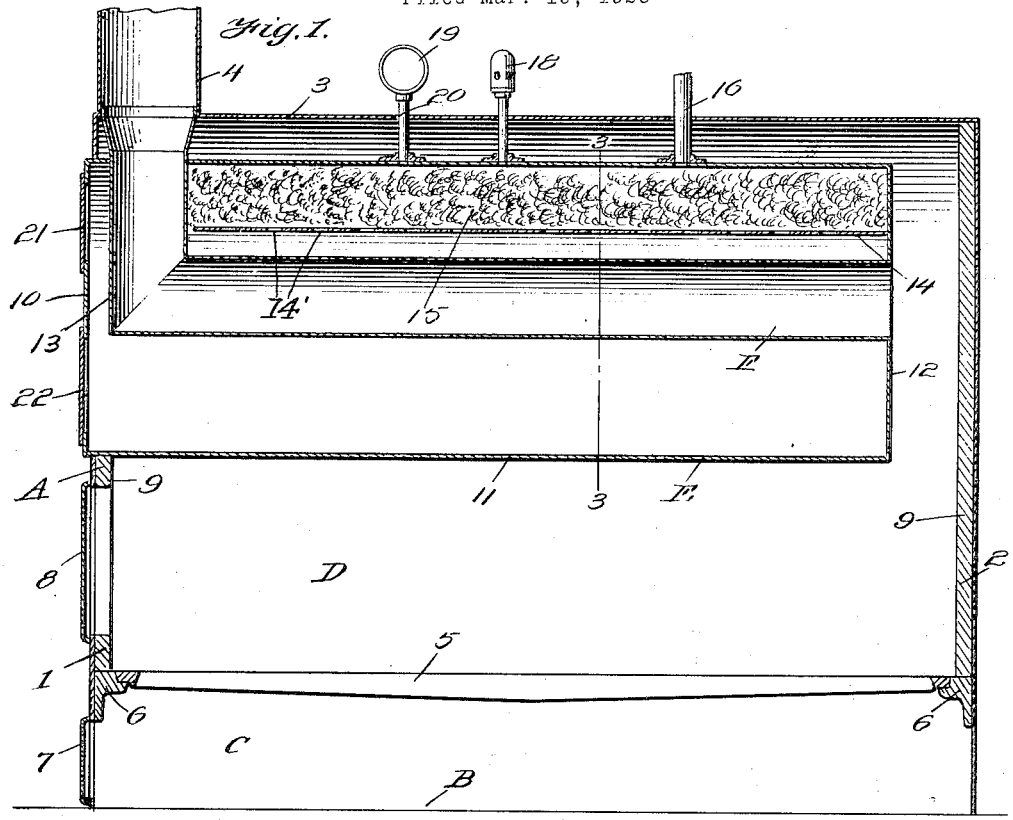
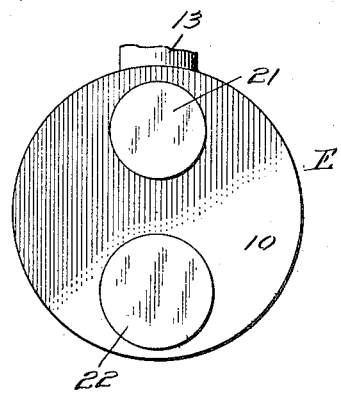
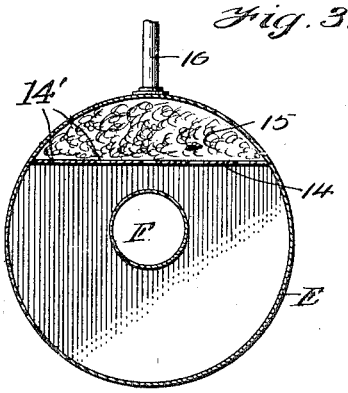
Inventor
B. R. Pfeifer.
By Geo. F. Kimmel
Attorney Patented Mar. 27, 1923.

1,449,544

UNITED STATES PATENT OFFICE.

BERNARD R. PFEIFER, OF JESSIE, NORTH DAKOTA, ASSIGNOR TO THE PFEIFER STRAW GAS PRODUCER COMPANY, OF FARGO, NORTH DAKOTA, A CORPORATION OF NORTH DAKOTA.

APPARATUS FOR DESTRUCTIVELY DISTILLING VEGETABLE MATERIAL.

Application filed March 15, 1920. Serial No. 365,755.

*To all whom it may concern:*

Be it known that I, BERNARD R. PFEIFER, a citizen of the United States, residing at Jessie, in the county of Griggs and State of North Dakota, have invented certain new and useful Improvements in an Apparatus for Destructively Distilling Vegetable Material, of which the following is a specification.

This invention relates to improvements in apparatus for separating valuable by-products, such as gases, tars, oils and similar substances from vegetable matter, and the principal object thereof is to provide means for attaining a maximum heating efficiency of the furnace used in connection therewith for baking or coking the vegetable matter.

Another and equally important object of the invention is to provide a separator for by-products of vegetable matter wherein the gases arising from the vegetable matter acted upon will be de-hydrated and filtered before they are delivered from the retort containing them to a suitable storage tank.

In connection with the present invention attention is directed to my prior Patent 1,364,801, dated January 4, 1921, upon improvements in retorts for producing gas, tar, and creosote, from straw and other vegetable materials.

In order to clarify the various purposes and objects of the present invention it is pointed out that vegetable matter contains a number of valuable by-products which have heretofore been lost; for instance by properly treating one ton of straw approximately 100 gallons of creosote, and 40 gallons of tar may be obtained in addition to a great quantity of gas which is valuable for illuminating and heating purposes. Also by treating one ton of flax straw about 30 gallons of an oil, approximating linseed oil in viscosity and color is obtained instead of creosote, and corn stalks yield about the same by-products as common straw. Consequently it will be seen that an apparatus of this character is very valuable.

For the purpose of illustrating this invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangement and organization of these instrumentalities as herein shown and described.

In the drawings:

Figure 1 is a sectional side elevation of the apparatus in its entirety showing to advantage the construction of the furnace, the retort, and the packing used in filtering and de-hydrating the gases arising from vegetable matter carried in the retort.

Figure 2 is an end view of the retort, and

Figure 3 is a view on the line 3—3 of Figure 1.

Like characters of reference indicate like or similar parts throughout the several views, in which:

A designates in its entirety a furnace structure which has a front wall 1, a rear wall 2, and a top wall 3, through the forward end of which is received the base of a chimney 4. Spaced from the foundation B of the chimney is a grate 5 which is mounted on brackets 6 and divides the furnace into an ash pit C and a fire box D, access to which is obtained through doors 7 and 8 respectively closing openings, for the pupose, formed in the front wall 1. Portions of both the front and rear wall are protected by fire brick 9 in the manner clearly illustrated in Figure 1.

Extending rearwardly, as well as longitudinally of the furnace A is a cylindrical, elongated retort E for receiving vegetable matter, the front end 10 of which extends through the front wall 1 of the furnace and is suitably secured so that the remaining portions, that is, the side wall 11 and rear end wall 12 of the retort will be spaced from the furnace walls, consequently permitting the heated air arising therefrom to circulate freely thereabout. Carried within and arranged longitudinally of the retort E and spaced from the walls thereof is a flue F which communicates with the furnace through the rear end wall 12 of the retort, and has its end adjacent the front wall 10 bent vertically as at 13 to communicate with the chimney 4, so that the heated air will also pass through the retort as well as around it as before described.

In order to filter and dehydrate the gases arising from the vegetable matter in the retort a foraminated partition 14 is provided in the upper portion thereof upon which is carried an asbestos composition 15 through which the gases pass as they travel to an outlet pipe 16 which communicates with the retort and extends to a suitable storage tank (not shown). The openings in the partition 14 are indicated at 14'. Furthermore in order to prevent undue pressure of gas in the retort a safety valve 18 is connected with the retort and the amount of such pressure may be ascertained from inspection of a visible pressure gauge 19 connected with the retort by a conduit 20 as illustrated in Figure 1.

Two openings are provided in the front wall of the retort which are closed by doors 21 and 22 so that access may be gained either to the asbestos composition 15 or the vegetable matter, and attention is called to the fact that when the vegetable matter is thoroughly baked or coked it may be removed by opening the door 22 and placed upon the grate where it will serve as fuel, thus effecting a material saving in the cost of operating the apparatus.

In operation the vegetable matter is placed in the retort and a hot fire is built upon the grate of the furnace, whereupon the vegetable matter will be thoroughly coked or baked and the gases arising therefrom will pass through the asbestos material 15 to the outlet pipe 16, and from thence will be delivered to a storage tank where they may be distilled into their respective constituents, such as creosote, an oil approximating linseed oil, or other distillants, depending upon the type of vegetable matter placed in the retort. Attention is particularly directed to the fact that the heated air arising from the furnace passes entirely around the walls of the retort, and through the retort by means of the flue F, consequently a maximum heating efficiency obtained. Furthermore, by utilizing the coked vegetable matter as fuel for use in the furnace, a material saving in the cost of operation of the apparatus is effected.

From the foregoing description taken in connection with the accompanying drawings, it is thought that a clear and comprehensive understanding of the construction, operation, and advantages of the invention may be had, but while I have shown and described the device as embodying a specific structure, I desire it to be understood that such changes may be made in said structure, as do not depart from the spirit and scope of the invention as claimed.

What I claim is:

1. An apparatus for destructively distilling vegetable material, comprising a retort for receiving vegetable matter, means within the upper portion of said retort for filtering gases arising from the lower portion thereof and means for heating the retort.

2. An apparatus for destructively distilling vegetable material, comprising a retort for receiving vegetable matter, and a filtering material within the retort and extending along the upper wall thereof for filtering gases arising from the lower portion of the same, and means for heating the retort.

3. An apparatus for destructively distilling vegetable material, comprising a retort for receiving vegetable matter, a foraminated partition in the retort dividing the same transversely extending compartments, asbestos packing in one of the compartments for filtering gases arising from vegetable matter contained in the other compartment, and means for heating the retort.

4. An apparatus for destructively distilling vegetable material, comprising a retort, a flue extending through the retort, a furnace structure enveloping the retort and communicating with the flue, means for obtaining access to the interior of the retort and furnace, a foraminated partition dividing said retort into upper and lower compartments, a filtering material within the upper of said compartments for filtering gases arising from the lower compartment, and means for drawing off gases from an upper compartment of the retort for the purpose described.

5. An apparatus for destructively distilling vegetable material, comprising a retort having side and end walls, a flue carried in the retort and opening through the side walls and one end, a furnace structure enveloping the retort and supporting the same at one end, the remaining portion of the retort being spaced therefrom, and means carried in the retort for filtering the gases arising therefrom for the purpose set forth.

6. An apparatus for destructively distilling vegetable material comprising a furnace, a retort extending rearwardly of the furnace and spaced from the rear wall thereof, a flue extending centrally through the retort from the rear end thereof, and connecting an angularly disposed flue adjacent the front end of the same, a filtering compartment formed in the upper portion of the retort, and extending between the rear wall thereof and the anularly disposed portion of said flue, and means for drawing off the gases from said filtering compartment.

7. An apparatus for destructively distilling vegetable material comprising a furnace, a retort within said furnace, a filtering compartment formed in the upper portion of said retort and extending a major length thereof, and means for drawing off the gases from said filtering compartment.

In testimony whereof, I affix my signature hereto.

BERNARD R. PFEIFER.